United States Patent [19]

Nishizawa

[11] Patent Number: 5,215,722
[45] Date of Patent: Jun. 1, 1993

[54] CATALYTIC CONVERTER WITH ELECTRICALLY RESISTIVE CATALYST SUPPORT

[75] Inventor: Kimiyoshi Nishizawa, Yokohama, Japan

[73] Assignee: Nissan Motor Co., Ltd., Yokohama, Japan

[21] Appl. No.: 766,181

[22] Filed: Sep. 27, 1991

[30] Foreign Application Priority Data

Sep. 28, 1990 [JP] Japan ................................ 2-258903

[51] Int. Cl.$^5$ .......................... F01N 3/10; B01D 50/00
[52] U.S. Cl. ...................................... 422/174; 422/171; 422/179; 422/180; 60/299; 60/300
[58] Field of Search .................. 60/288, 290, 299, 300; 422/171, 177, 174, 179, 180, 181, 221, 222; 55/521, DIG. 30

[56] References Cited

U.S. PATENT DOCUMENTS

| | | | |
|---|---|---|---|
| 3,770,389 | 10/1973 | Kitzner et al. | 23/288 |
| 4,220,625 | 9/1980 | Toh et al. | 422/180 |
| 4,273,681 | 6/1981 | Nonnenmann | 252/472 |
| 4,719,680 | 1/1988 | Cyron | 29/157 R |
| 4,928,485 | 5/1990 | Whittenberger | 60/299 |
| 4,958,428 | 9/1990 | Humpolik | 29/890 |
| 4,976,929 | 12/1990 | Cornelison et al. | 422/174 |
| 5,055,275 | 10/1991 | Kanniainen et al. | 422/180 |
| 5,070,694 | 12/1991 | Whittenberger | 60/300 |

FOREIGN PATENT DOCUMENTS 2902779 7/1980 Fed. Rep. of Germany .
8812924 1/1989 Fed. Rep. of Germany .
2-223622 9/1990 Japan .

Primary Examiner—Robert J. Warden
Assistant Examiner—Christopher Y. Kim
Attorney, Agent, or Firm—Foley & Lardner

[57] ABSTRACT

A catalytic converter includes a housing and a catalyst support disposed in the housing. The catalyst support includes a central electrode, a generally cylindrical honeycomb structure and a hollow cylindrical electrode disposing therein the honeycomb structure. The honeycomb structure includes first, second and third metal sheets which are spirally wound about the central electrode and corrugated in shape. The first metal sheet has an inner end electrically connected to the central electrode and an outer end electrically connected to the hollow cylindrical electrode. The radial distance between the central electrode and the second metal sheet is different from that between the central electrode and the third metal sheet. The third metal sheet is spaced away from an imaginary solid having a surface defined by imaginary straight lines extending from an axis of the central electrode in a radial direction and passing through a periphery of the second metal sheet.

15 Claims, 4 Drawing Sheets

CATALYTIC CONVERTER WITH ELECTRICALLY RESISTIVE CATALYST SUPPORT

BACKGROUND OF THE INVENTION

1. Field of the Invention

The present invention relates in general to a catalytic converter incorporated in an automotive exhaust system, and more particularly to a catalytic converter which has an electrically resistive catalyst support for heating a catalyst up to operating temperature by electrical energy.

2. Description of the Prior Art

U.S. Pat. No. 3,770,389 discloses a catalytic converter for transforming noxious emissions into harmless carbon dioxide and water vapor. The catalytic converter has an electrically resistive catalyst support for heating the catalyst up to an operating temperature where the catalyst begins catalytic activity by electrical energy. The catalyst support comprises a corrugated stainless steel sheet and a flat stainless steel sheet which are sandwiched together and wound spirally. Both sheets are coated with thin coatings of an electrically insulating ceramic material in which catalyst particles are uniformly dispersed. Both sheets are connected to an external electric power source. Thus, upon energization, the electric current flows spirally through the sheets against a high electrical resistance possessed by the spirally wound stainless steel sheets. Thus, the catalyst is heated up to its operating temperature within a short time after an engine is started.

However, the conventional catalytic converters of the above-mentioned type have the following drawback.

That is, during manufacturing and/or use of them, it tends to occur that the electrically insulating coatings on the stainless steel sheets peel off from the sheets. This induces a short circuit between neighboring layers of the stainless sheets and thus lowers the electric resistance of the catalyst support. With this reduced electric resistance, the catalyst support can not be heated up to a degree sufficient for heating the catalyst to the operating temperature.

SUMMARY OF THE INVENTION

It is therefore an object of the present invention to provide a catalyst support which has a substantially high electrical resistance without using the electrically insulating coatings.

According to the present invention, there is provided a catalytic converter including: a housing; and a catalyst support disposed in the housing, the catalyst support including a central electrode, a generally cylindrical honeycomb structure essentially consisting of first, second and third metal sheets which are spirally wound about the central electrode, and a hollow cylindrical electrode disposing therein the honeycomb structure, the first metal sheet being corrugated in shape and having an inner end electrically connected to the central electrode and an outer end electrically connected to the hollow cylindrical electrode, the radial distance between the central electrode and the second metal sheet being different from the radial distance between the central electrode and the third metal sheet, wherein the third metal sheet is spaced away from an imaginary solid having a surface defined by imaginary straight lines extending from an axis of the central electrode in a radial direction and passing through a periphery of the second metal sheet.

DESCRIPTION OF PREFERRED EMBODIMENTS

Referring to FIGS. 1 to 4, a catalytic converter of a first embodiment of the present invention is illustrated, which is denoted by reference number 10.

Figure 1:
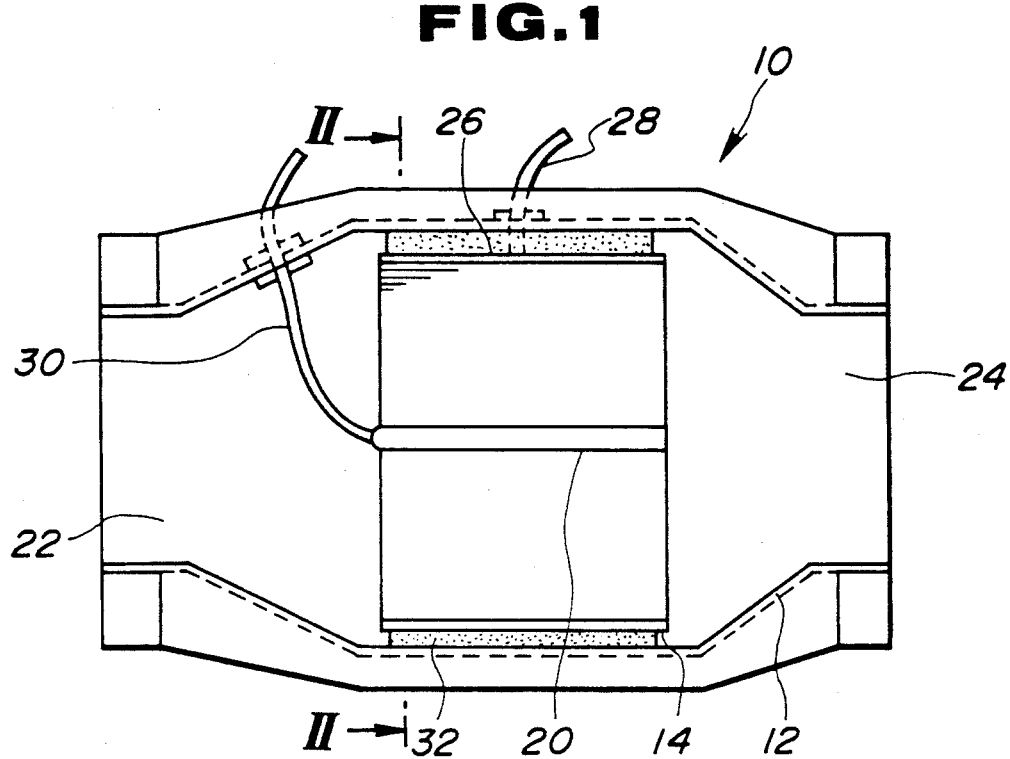
FIG. 1 is a longitudinal cross-sectional view of a catalytic converter of a first embodiment in accordance with the present invention.
Figure 2:
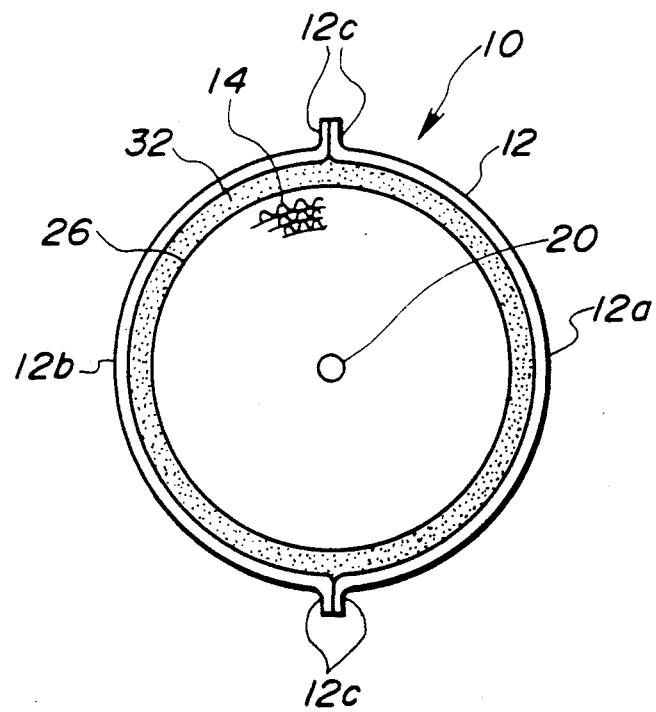
FIG. 2 is a transverse cross-sectional view which is taken along the line II—II of FIG. 1.

As is seen from FIG. 1, the catalytic converter 10 comprises a housing 12 and a catalyst support 14 which is disposed in the housing 12. As will be described hereinafter in detail, the catalyst support 14 comprises corrugated metal sheets 16a to 16d and flat metal sheets 18a to 18d which are wound together about an electrically conductive metal core 20 so as to form a honeycomb cylindrical structure (see FIG. 3). The metal core 20 is located coaxially within the housing 12 (see FIG. 2).

The housing 12 has an inlet 22 which is connected to an engine exhaust manifold (not shown) and an outlet 24 which communicates with the atmosphere through an exhaust pipe (not shown). The housing 12 is constructed of two counterparts 12a and 12b which have flanges 12c, respectively. The counterparts 12a and 12b are joined with each other at the flanges 12c. The catalyst support 14 is positioned between the inlet 22 and the outlet 24 of the housing 12.

An electrically conductive tube 26 which is hollow cylindrical in shape surrounds the catalyst support 14. Outer edges of the corrugated and flat metal sheets 16a to 16d and 18a to 18d are connected electrically to the tube 26. A first electrical lead 28 is connected at one end thereof to the tube 26 and at the other end (not shown) thereof to a negative terminal of a battery (not shown) through a switch (not shown).

A second electrical lead 30 is connected at one end thereof to the metal core 20 and at the other end (not shown) thereof to a positive terminal of the battery. Thus, the catalyst support 14 can be energized when closing the switch.

A ceramic fiber mat 32 which is hollow cylindrical in shape is disposed between the tube 26 and the housing 12 for providing an electric insulation therebetween.

Figure 3:
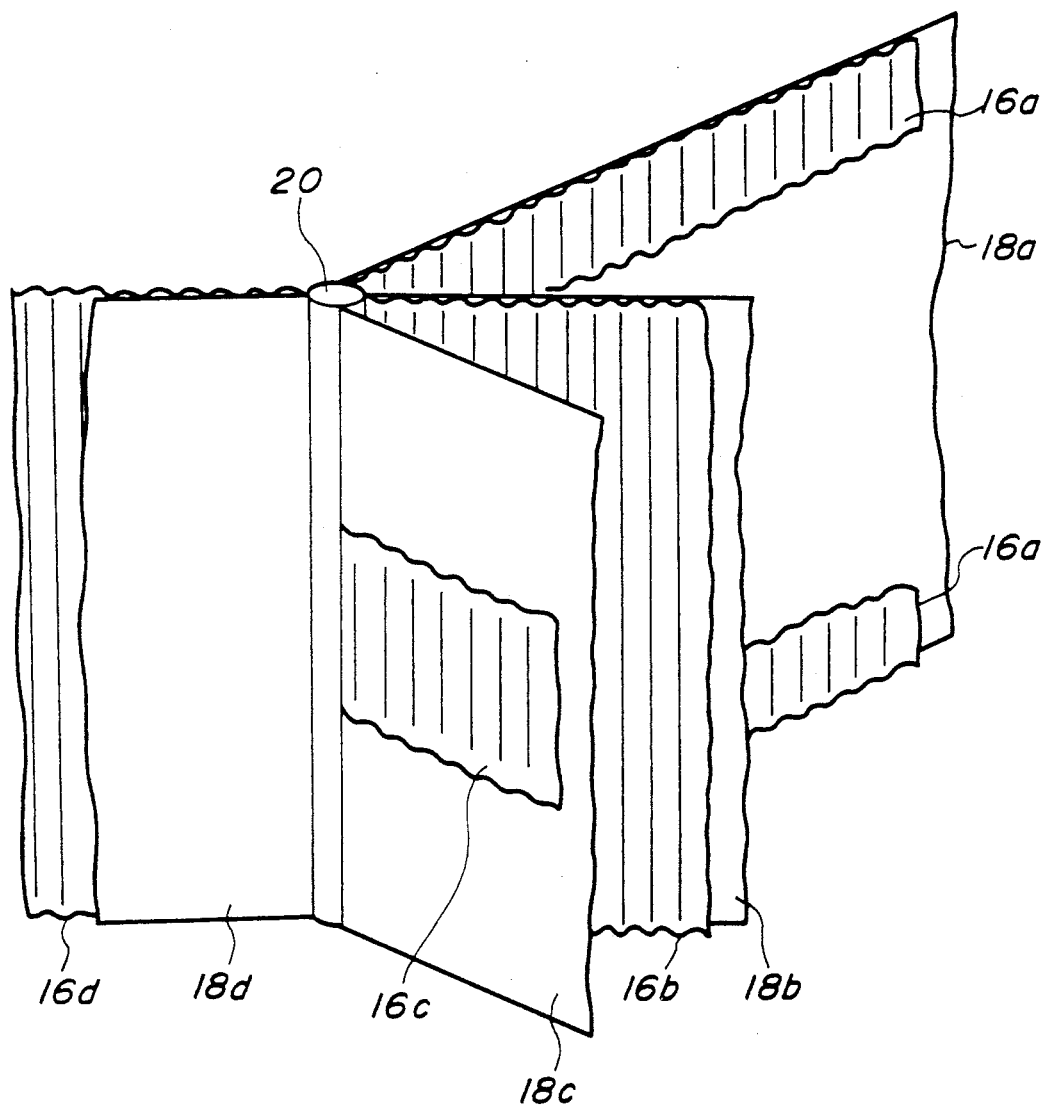
FIG. 3 is a perspective enlarged view of a catalyst support of the catalytic converter of the first embodiment, showing a condition in which corrugated stainless steel sheets and flat stainless steel sheets extend radially outwardly from a metal core.

Assembly of the catalyst support 14 will be described in the following with reference to FIG. 3.

First, the flat metal sheets 18a to 18d having widths of 100 mm defined along the axis of the metal core 20 are connected at respective inner ends thereof to the metal core 20 in such a manner that the inner ends are equidistantly spaced about the periphery of the metal core 20. The metal core 20 has a longitudinal length of 100 mm.

Then, two first thinner corrugated metal sheets 16a are connected to longitudinally opposed end portions of the metal core 20 so as to be in abutment with opposed end portions of the first flat metal sheet 18a. Each first corrugated metal sheet 16a has a width of 15 mm which is defined along the axis of the metal core 20. A second corrugated metal sheet 16b having a width of 100 mm which is defined along the axis of the metal core 20 is connected to the metal core 20 so as to be in abutment with the second flat metal sheet 18b. A third corrugated metal sheet 16c having a width of 30 mm which is defined along the axis of the metal core 20 is connected to a longitudinally middle portion of the metal core 20 so as to be in abutment with the third flat metal sheet 18c. A fourth corrugated metal sheet 16d having a width of 100 mm which is defined along the axis of the metal core 20 is connected to the metal core 20 so as to be in abutment with the fourth flat metal sheet 18d. Therefore, inner ends of the corrugated metal sheets 16a to 16d are also equidistantly spaced about the periphery of the metal core 20. Outer ends of the corrugated sheets 16a to 16d and the flat sheets 18a to 18d are electrically connected to the tube 26. It is to be noted that each pair of the corrugated and flat metal sheets 16a and 18a, 16b and 18b, 16c and 18c, or 16d and 18d have the same length which is defined radially outwardly from the metal core 20. Each corrugated metal sheet 16a, 16b, 16c or 16d and each flat metal sheet 18a, 18b, 18c or 18d are positioned alternately, as illustrated.

Then, the corrugated metal sheets 16a to 16d and the flat metal sheets 18a to 18d are wound spirally about the metal core 20 a predetermined number of times so that each corrugated metal sheet is sandwiched between two flat metal sheets. With this winding, a honeycomb structure having a plurality of small gas flow passages is produced (partially shown in FIG. 2). The metal sheets are brazed to one another with nickel or the like. By using a known catalyst coating technique, a suitable catalyst is coated on inner surfaces of honeycomb cells (no numeral). Then, the catalyst support 14 is received in the tube 26 and the ceramic fiber mat 32. Then, the catalyst support 14, the tube 26 and the ceramic fiber mat 32 are disposed in the housing 12.

Figure 4:
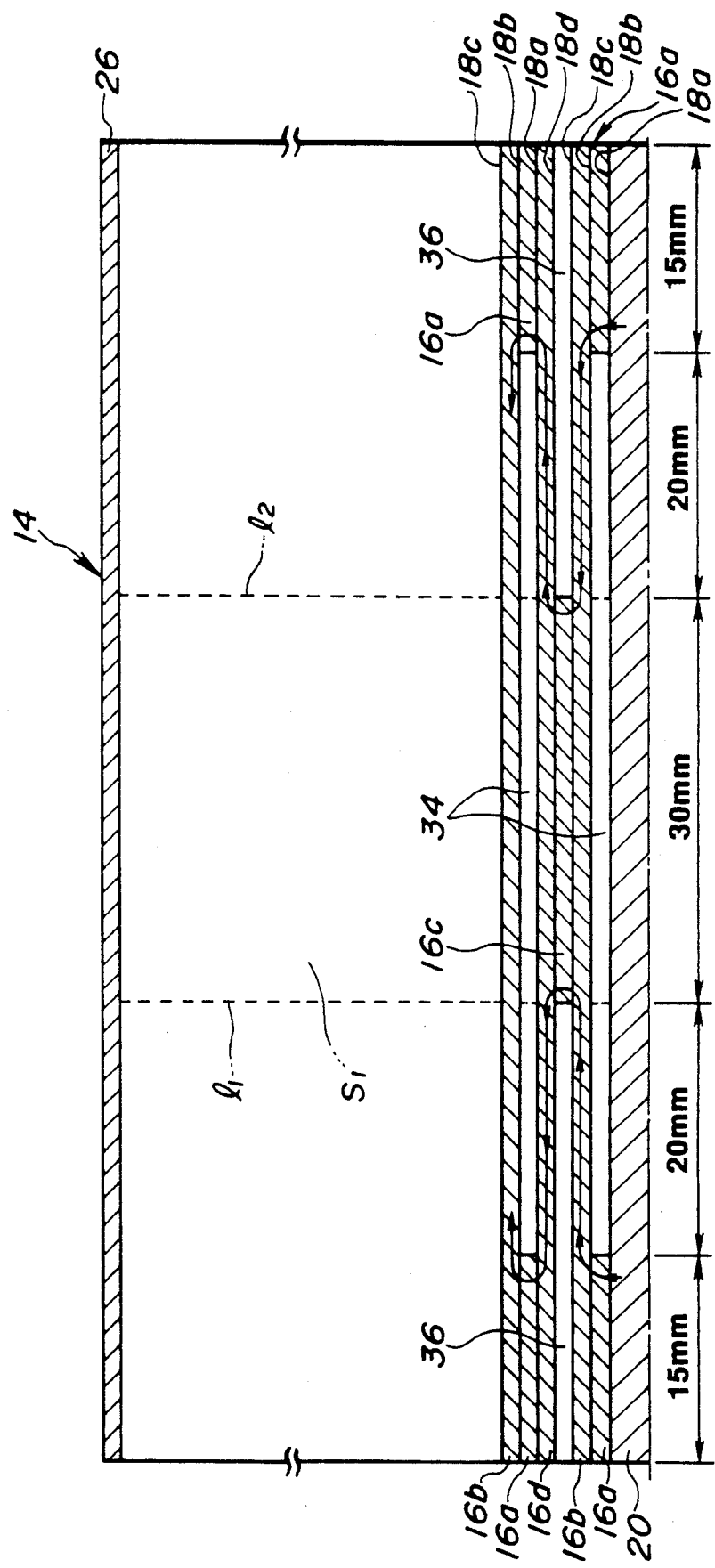
FIG. 4 is a longitudinal cross-sectional and enlarged, but partially cutaway, view of the catalyst support of the catalytic converter of the first embodiment, showing schematic passages of electric current.

As is seen from FIG. 4, the catalyst support 14 thus produced has first and second spaces 34 and 36 alternately therein in a radial direction. Therefore, when the switch of the battery is closed, the electric current flows substantially serpentinely from the metal core 20 to the tube 26 as is schematically illustrated by arrows. That is, first, the electric current flows radially outwardly from the metal core 20 to the first corrugated metal sheets 16a through the first flat metal sheet 18a. Then, the electric current flows axially inwardly from the first corrugated metal sheets 16a to the third corrugated sheet 16c through the second flat, the second corrugated and the third flat metal sheets 18b, 16b and 18c. Then, the electric current flows axially outwardly from the third corrugated sheet 16c to the first corrugated sheets 16a through the fourth flat, the fourth corrugated and the first flat metal sheets 18d, 16d and 18a. Although it is not fully illustrated in FIG. 4, the corrugated and flat metal sheets 16a to 16d and 18a to 18d are wound spirally about the metal core 20 so as to construct the honeycomb structure which is radially outwardly continuous from the metal core 20 to the tube 26.

Since the electric current flows substantially serpentinely, that is, since a substantially long pathway of the electric current is provided in the catalyst support 14, greater heat is generated by the catalyst support 14. The electrical resistance of the catalyst support 14 converts the electrical energy into heat that is transferred conductively to the catalyst coated on the inner surfaces of the honeycomb cells. Therefore, after the engine is started, the temperature of the catalyst increases rapidly to operating temperature where the catalyst begins catalytic activity.

Regarding the position of the corrugated metal sheets 16a relative to the corrugated metal sheet 16c, it is understood that the corrugated metal sheets 16a are spaced away from an imaginary solid "$S_1$" which is cylindrical in shape and has opposed surfaces defined by straight lines $l_1$ and $l_2$ extending from the axis of the metal core 20 in a radial direction and passing through opposed edges of the corrugated metal sheet 16c.

For example, when ferritic stainless steel having a thickness of 50 μm and containing 20% and 15% by weight of Cr and Al respectively was used for the sheets 16a to 16d and 18a to 18d and the catalyst support 14 was so constructed as to have an outer diameter of 100 mm and an axial length of 100 mm which is defined along the axis of the metal core 20, the electrical resistance of the catalyst support 14 was about 0.03 Ω. Therefore, electric power to be converted to heat was about 3 KW.

In the above-mentioned embodiment, flat stainless sheets 18a to 18d are used. However, if desired, the flat stainless sheets 18a to 18d may be replaced with corrugated stainless sheets having a height of corrugations smaller than the corrugations of the corrugated stainless sheets 16a to 16d.

Figure 5:
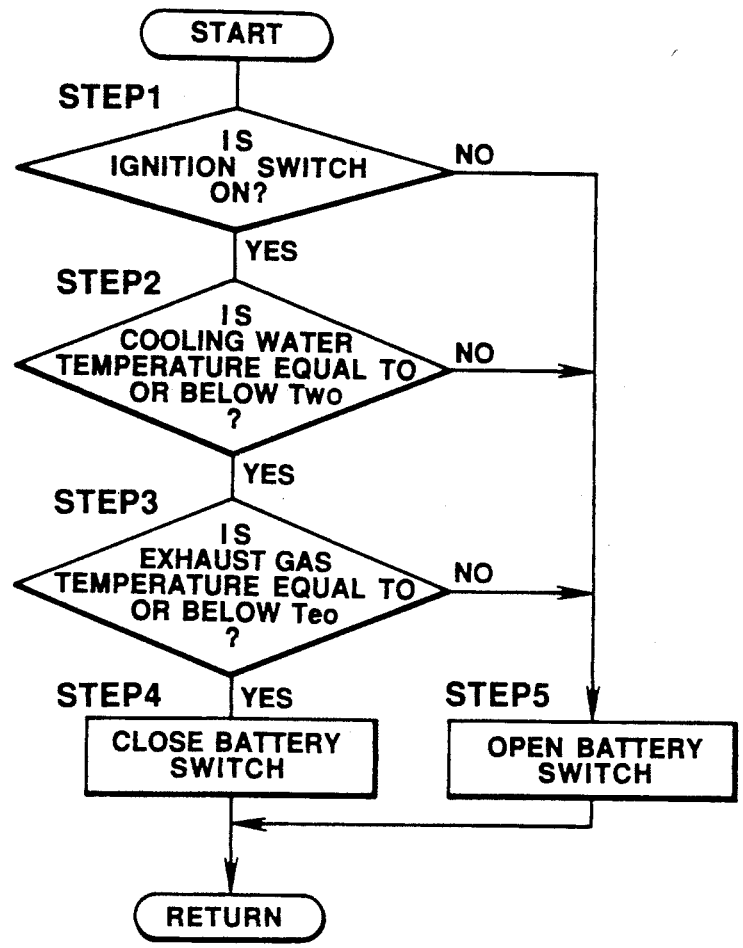
FIG. 5 is a flowchart showing operation steps carried out in a control unit.

A microcomputer is used to control the switch of the battery in accordance with two temperature conditions. As is seen from FIG. 5, at step 1 it is determined if an ignition switch of the engine is on or off. At step 2 it is determined by a cooling water temperature sensor if cooling water temperature is equal to or below a predetermined temperature "Two" or not. Two is a temperature ranging from 30° C. to 60° C. At step 3 it is determined by an exhaust gas temperature sensor if exhaust gas temperature is equal to or below a predetermined temperature "Teo". Teo is a temperature ranging from 350° C. to 400° C. The exhaust gas temperature sensor is provided at a portion of the exhaust pipe which is immediately downstream of the catalytic converter 10. At step 4 a command to close the switch of the battery is issued for heating the catalyst support. At step 5 a command to open the switch is issued. As is clearly shown in FIG. 5, only if the outcomes of steps 1 to 3 are affirmative, is the switch closed at step 4. On the other hand, if at least one of the outcomes of steps 1 to 3 is negative, the switch is opened.

Figure 6:
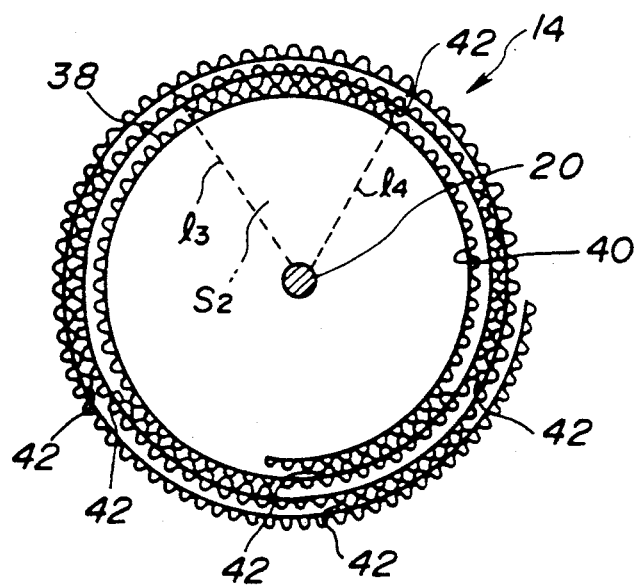
FIG. 6 is a view similar to FIG. 2, but showing a second embodiment.

Referring to FIG. 6, a second embodiment of the present invention will be described in the following.

Parts substantially the same as those of the above-mentioned first embodiment are denoted by the same numerals and a detailed explanation of them will be omitted from the following description.

A rectangular corrugated stainless sheet 38 is placed on a rectangular flat stainless sheet 40. Inner and outer ends of the corrugated stainless sheet 38 and the flat stainless sheet 40 are electrically connected to the metal core 20 and an electrically conductive tube (not shown in FIG. 6). The sheets 38 and 40 have the same width, which is defined along the axis of the metal core 20 and have the same length of spirally wound sides thereof. A plurality of corrugated sheet pieces 42 each are interposed between the corrugated and flat stainless sheets 38 and 40. Each corrugated sheet piece 42 has the same width which is defined along the axis of the metal core 20 as that of the sheets 38 and 40 and has arc side lengths much smaller than that of the sheet 38 or 40. The corrugated sheet pieces 42 are positioned away from one another such that one corrugated sheet piece 42 does not radially overlap another corrugated sheet piece 42 which is positioned radially adjacent to the one corrugated sheet piece 42. Therefore, the electric current does not flow radially directly from the metal core 20 to the tube 26 (not shown) but flows substantially serpentinely. Thus, similar to the first embodiment, a substantially high electric resistance of the catalyst support 14 is obtained to heat the catalyst quickly.

Regarding the position of one corrugated sheet piece 42 relative to another corrugated sheet piece 42 which is radially adjacent to the one corrugated sheet piece 42 (viz., this another sheet piece is positioned radially outwardly or radially inwardly next to the one sheet piece), it is understood that this another sheet piece 42 is positioned away from an imaginary solid "$S_2$" having opposed sectorial surfaces and two rectangular surfaces defined by straight lines $l_3$ and $l_4$ extending from the axis of the central electrode 20 in a radial direction and passing through two opposed edges of the one sheet piece 42, the edges being defined along the axis of the central electrode 20.

An advantage of the present invention will be described in the following.

A substantial high electrical resistance of the catalyst support is obtained without using an electrically insulating coating. Therefore, the structure of the catalyst support is simplified, and thus the production cost of the converter can be reduced.

What is claimed is:

1. A catalytic converter comprising:
   a housing having an inlet to admit an exhaust gas stream into said housing and an outlet to remove said exhaust gas stream from said housing; and
   a catalyst support which is disposed in said housing and positioned between said inlet and said outlet of said housing, said catalyst support including
   a central electrode;
   a hollow cylindrical electrode disposed about said central electrode; and
   a cylindrical honeycomb structure disposed in said hollow cylindrical electrode, said honeycomb structure including first, second, third, and fourth corrugated sheets which are spirally wound about said central electrode a predetermined number of times so as to alternately position said first, second, third, and fourth corrugated sheets around said central electrode, said first corrugated sheet being closest to said central electrode when wound, said second corrugated sheet being second closest to said central electrode when wound, said third corrugated sheet being third closest to said central electrode when wound, and said fourth corrugated sheet being fourth closest to said central electrode when wound,
   each of said first, second, third, and fourth corrugated sheets having inner and outer ends which are respectively electrically connected to said central electrode and said hollow cylindrical electrode,
   said wound first and third corrugated sheets being spaced away from each other in an axial direction of said central electrode, said second corrugated sheet having first and second portions, said first portion of said second corrugated sheet being a portion of said second corrugated sheet that is immediately adjacent to said first corrugated sheet, said second portion of said second corrugated sheet being a portion of said second corrugated sheet that is immediately adjacent to said third corrugated sheet,
   said fourth corrugated sheet having first and second portions, said first portion of said fourth corrugated sheet being a portion of said fourth corrugated sheet that is immediately adjacent to said first corrugated sheet, said second portion of said fourth corrugated sheet being a portion of said fourth corrugated sheet that is immediately adjacent to said third corrugated sheet, and
   wherein electric current flows from said first corrugated sheet to said third corrugated sheet through said second corrugated sheet and then from said third corrugated sheet to said first corrugated sheet through said fourth corrugated sheet through a serpentine pathway which is longer than a radius of said honeycomb structure to increase electrical resistance of said honeycomb structure.

2. A catalytic converter as claimed in claim 1, further comprising an electric circuit means for connecting an external electric power source to both said central electrode and said hollow cylindrical electrode.

3. A catalytic converter as claimed in claim 2, in which said central electrode is connected to a positive terminal of said external electric power source, and in which said hollow cylindrical electrode is connected to a negative terminal of said external electric power source.

4. A catalytic converter as claimed in claim 1, further comprising another first corrugated sheet which is spaced away from said previous first corrugated sheet and said third corrugated sheet in an axial direction of said central electrode, said another first corrugated sheet having an inner end which is aligned with an inner end of said previous first corrugated sheet in an axial direction of said central electrode, and further comprising first, second, third and fourth flat sheets which are spirally wound about said central electrode a predetermined number of times.

5. A catalytic converter as claimed in claim 4, in which said first flat sheet, said first corrugated sheets, said second flat sheet, said second corrugated sheet, said third flat sheet, said third corrugated sheet, said fourth flat sheet, and said fourth corrugated sheet are alternately positioned in a radial direction of said central electrode.

6. A catalytic converter as claimed in claim 4 in which inner ends of said first corrugated sheets are electrically connected to longitudinally opposed end portions of said central electrode, in which an inner end of said third corrugated sheet is electrically connected to a longitudinally middle portion of said central electrode, and in which inner ends of said first, second, third and fourth flat sheets extend between longitudinally opposed end portions of said central electrode and are electrically connected to said central electrode.

7. A catalytic converter as claimed in claim 6, in which said second and fourth corrugated sheets have inner end sides secured to said central electrode, said inner end sides extending between the longitudinal opposed end portions of said central electrode.

8. A catalytic converter as claimed in claim 4, in which outer ends of said first, second, third and fourth flat sheets are respectively electrically connected to said hollow cylindrical electrode.

9. A catalytic converter as claimed in claim 4, in which inner ends of said first, second, third, and fourth corrugated sheets are equidistantly spaced about a periphery of said central electrode, and in which inner ends of said first, second, third, and fourth flat sheets are equidistantly spaced about said periphery of said central electrode.

10. A catalytic converter as claimed in claim 1, further comprising an electric insulation member which is hollow cylindrical in shape and disposed between said hollow cylindrical electrode and said housing.

11. A catalytic converter as claimed in claim 1, in which said second corrugated sheet has a third portion thereof which is interposed between said first and second portions of said second corrugated sheet with respect to an axial direction of said central electrode and spaced away from adjacent layers of said honeycomb structure with respect to a radial direction of said central electrode, and in which electric current flows from said first corrugated sheet in a substantially radial direction, from said first portion to said second portion via said third portion in a substantially axial direction, and from said second portion of said second corrugated sheet to said third corrugated sheet in a substantially radial direction.

12. A catalytic converter comprising:
 a housing having an inlet to admit a gas stream into said housing and an outlet to remove said gas stream from said housing; and
 a catalyst support which is disposed in said housing and is positioned between said inlet and said outlet of said housing, said catalyst support including
 a central electrode;
 a hollow cylindrical electrode disposed about said central electrode; and
 a cylindrical honeycomb structure including a larger corrugated sheet and a plurality of smaller corrugated sheet pieces which are wound in a spiral about said central electrode such that said larger corrugated sheet has a plurality of layers around said central electrode, each layer being a 360° arc of said spiral,
 said larger corrugated sheet having an inner end electrically connected to said central electrode and an outer end electrically connected to said hollow cylindrical electrode;
 wherein said smaller corrugated sheet pieces are positioned away from one another such that one smaller corrugated sheet piece interposed between first and second layers of said larger corrugated sheet is spaced away, in a circumferential direction of said central electrode, from another smaller corrugated sheet piece which is interposed between said second layer and a third layer of said larger corrugated sheet, said first, second, and third layers of said larger corrugated sheet being consecutively arranged around said central electrode such that electric current flows through a serpentine pathway which is longer than a radius of said honeycomb structure to increase electrical resistance of said honeycomb structure.

13. A catalytic converter as claimed in claim 12, further comprising a flat sheet which is wound about said central electrode together with said larger corrugated metal sheet a predetermined number of times to construct said honeycomb structure.

14. A catalytic converter as claimed in claim 13, in which each of said smaller corrugated sheet pieces is interposed between said larger corrugated sheet and said flat sheet.

15. A catalytic converter as claimed in claim 12, in which said second layer of said larger corrugated sheet has first and second portions which are respectively adjacent to said one and said another smaller corrugated sheet pieces with respect to a radial direction of said central electrode and a third portion which is interposed between said first and second portions with respect to a circumferential direction of said central electrode, said third portion having a void space between said third portion and said first layer of said larger corrugated sheet and another void space between said third portion and said third layer of said larger corrugated sheet with respect to a radial direction of said central electrode and in which electric current flows from said one smaller corrugated sheet piece to said first portion of said second layer in a substantially radial direction, from said first portion to said second portion via said third portion in a substantially circumferential direction, and from said second portion to said another smaller corrugated sheet piece in a substantially radial direction.

* * * * *